United States Patent
Li

(10) Patent No.: US 11,099,369 B2
(45) Date of Patent: Aug. 24, 2021

(54) FULLY AUTOMATIC MICROSCOPIC SCANNER HAVING FLAT LIGHT SOURCE

(71) Applicant: Xinyu Li, Beijing (CN)

(72) Inventor: Xinyu Li, Beijing (CN)

( * ) Notice: Subject to any disclaimer, the term of this patent is extended or adjusted under 35 U.S.C. 154(b) by 614 days.

(21) Appl. No.: 16/037,178

(22) Filed: Jul. 17, 2018

(65) Prior Publication Data

US 2019/0033568 A1 Jan. 31, 2019

Related U.S. Application Data

(63) Continuation-in-part of application No. PCT/CN2017/095135, filed on Jul. 31, 2017.

(51) Int. Cl.
| | |
|---|---|
| *G02B 21/24* | (2006.01) |
| *G02B 21/26* | (2006.01) |
| *G02B 21/36* | (2006.01) |
| *G02B 21/00* | (2006.01) |
| *G02B 21/08* | (2006.01) |
| *H04N 5/232* | (2006.01) |

(Continued)

(52) U.S. Cl.
CPC ..... *G02B 21/0036* (2013.01); *G02B 21/0032* (2013.01); *G02B 21/086* (2013.01); *G02B 21/245* (2013.01); *G02B 21/26* (2013.01); *G02B 21/361* (2013.01); *H04N 5/232* (2013.01); *G02B 21/002* (2013.01); *H04N 5/2253* (2013.01); *H04N 5/247* (2013.01)

(58) Field of Classification Search
CPC ...... G02B 21/002–0084; G02B 21/086; G02B 21/36; G02B 21/361; G02B 21/362
See application file for complete search history.

(56) References Cited

U.S. PATENT DOCUMENTS

| | | |
|---|---|---|
| 4,204,045 A | 5/1980 | Kjellander et al. |
| 4,248,498 A | 2/1981 | Georges |
| 4,404,722 A | 9/1983 | Shimai |

(Continued)

FOREIGN PATENT DOCUMENTS

| | | |
|---|---|---|
| CN | 1881002 A | 12/2006 |
| CN | 202974843 U | 6/2013 |

(Continued)

*Primary Examiner* — Ryan S Dunning
(74) *Attorney, Agent, or Firm* — Werschulz Patent Law, LLC; Patricia P. Werschulz, Esq.

(57) ABSTRACT

A fully automatic microscopic scanner, comprising an image acquisition mechanism (IAM) with a line array camera. The IAM and the microscopic scanning mechanism move along X/Y/Z axis under the action of a power control mechanism. The light source mechanism illuminates an area greater than or equal to the total area of the tray and has a flat light source with a condenser, a cooling fan, a water cooling unit. A general control mechanism and a laser pre-focus system connects to the light source mechanism. The fully automatic microscopic scanner links the microscopic scanning mechanism and the IAM with the light source mechanism. Flexible adjustment of lens is achieved by making the lens move forwards and backwards, leftwards and rightwards and up and down. The light source mechanism and laser pre-focus system, the stage and the light source are fixed during the scanning process to achieve real-time accurate and fast focusing.

19 Claims, 8 Drawing Sheets

(51) Int. Cl.
*H04N 5/225* (2006.01)
*H04N 5/247* (2006.01)

(56) References Cited

U.S. PATENT DOCUMENTS

| | | |
|---|---|---|
| 4,836,667 A | 6/1989 | Ozeki |
| 5,367,401 A | 11/1994 | Saulietis |
| 5,659,376 A | 8/1997 | Uehara et al. |
| 6,118,582 A | 9/2000 | Buono |
| 7,180,689 B2 | 2/2007 | Shinada |
| 9,488,822 B2 | 11/2016 | Machida et al. |
| 2002/0024013 A1 | 2/2002 | Gerlach et al. |
| 2004/0083799 A1 | 5/2004 | Markakis et al. |
| 2005/0088731 A1 | 4/2005 | Shinada |
| 2005/0271548 A1 | 12/2005 | Yang et al. |
| 2011/0266181 A1 | 11/2011 | Morozov |
| 2013/0201553 A1 | 8/2013 | James et al. |
| 2013/0222895 A1 | 8/2013 | Gelbart |
| 2013/0294826 A1 | 11/2013 | Chen |
| 2018/0373017 A1* | 12/2018 | Dixon ................. G02B 21/361 |
| 2019/0033568 A1 | 1/2019 | Li |

FOREIGN PATENT DOCUMENTS

| | | |
|---|---|---|
| CN | 203084281 U | 7/2013 |
| CN | 204065545 U | 12/2014 |
| CN | 204556662 U | 8/2015 |
| CN | 105223682 A | 1/2016 |
| CN | 205027634 U | 2/2016 |
| CN | 107065160 A | 8/2017 |
| CN | 206818969 | 12/2017 |
| CN | 207850898 U | 9/2018 |
| CN | 109030371 A | 12/2018 |
| CN | 109445084 A | 3/2019 |
| JP | 2003140053 A | 5/2003 |
| JP | 4720078 | 10/2003 |
| JP | 2005128429 A | 5/2005 |

* cited by examiner

FULLY AUTOMATIC MICROSCOPIC SCANNER HAVING FLAT LIGHT SOURCE

CROSS-REFERENCE TO RELATED APPLICATIONS

This application is a bypass continuation-in-part of and claims priority under 35 U.S.C. §§ 111(a), 363 to a Patent Cooperation Treaty application PCT/CN2017/095135 filed in the People's Republic of China Patent Office on Jul. 31, 2017, which claims priority to of the patent applications, serial numbers 2017206557713 and 2017104242588, filed in the People's Republic of China on Jun. 7, 2017 and claims the priority thereof and is expressly incorporated herein by reference in its entirety.

This application is related to a Patent Cooperation Treaty application PCT/CN2018/090292, filed in the People's Republic of China Patent Office on Jun. 7, 2018 and which is a continuation-in-part of and claims the priority thereof to the same applications listed hereinabove.

TECHNICAL FIELD

The present disclosure relates generally to microscopic image scanning. More particularly, the present disclosure relates to a fully automatic image scanner.

BACKGROUND

In recent years, with the rapid development of computer cloud technology, Internet, big data analytics and other technologies, the digital acquisition of pathological-slide images has become a must.

At present, some manufacturers have used the microscope plus electric stage to achieve pathological slide scanning. However, this system may scan only one slide at a time because it cannot get out of the traditional microscope structure. Therefore, scanning efficiency is low. In order to solve this problem, many manufacturers have researched and developed a variety of automatic slide-feeding mechanisms to fulfil the need for unattended large-scale scanning beyond 8-hours-service times that are not possible in manual slide-feeding modes. But this automatic mechanism does not fundamentally solve the problem of low scanning efficiency. On the other hand, due to the lack of an industry standard thickness of pathological slides, the automatic slide-feeding mechanism is prone to failure. This leads to unattended scanning equipment failure which seriously impacts the next working day.

For example, a large hospital needs to scan 300 pathological slides every day, at an average of 15 slides per hour. Traditional micro-scanning equipment scans 120 slides over the course of 8 hours. This is far below meeting the daily needs. Additionally, traditional methods fail to scan a large number of previously stored pathological slides efficiently.

Traditional scanning includes a phased array camera, which can only take a picture after stopping during a mobile scanning process. In the process of moving, pausing and taking pictures under 40× magnification lens, nearly a thousand times of repetition is required for a 1.5 square centimeter slide is to be scanned. This seriously restricts scanning speed.

More importantly, if the object being scanned (e.g. an object in 96-well plate) is a liquid, the motion of a typical micro-scanning equipment base causes the liquid to shake. Thus, a quick scan cannot be conducted to get a clear image via a mobile scanning process.

It is evident that the methods and the use of the above-mentioned existing micro-scanning equipment are inconvenient and have too many defects. A new kind of automatic microscopic scanning mode, that expands the range of microscopic scanning, improves scanning efficiency, and delivers enhanced image quality of scanned slides is one of the important research and development goals sought by current enterprises.

While existing units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed, and it is contemplated that the claims may encompass one or more of the conventional technical aspects discussed herein.

BRIEF SUMMARY

The technical problem to be solved in the present invention is to provide a fully automatic microscopic scanner, with a fixed scanning platform mechanism and a mobile lens that can move forward, backward, leftward and rightward, up and down. The invention expands the range of microscopic scanning, improves scanning efficiency, and enhances the quality of scanned images. Thus the issues of low scanning efficiency and inability to scan fluids are overcome.

To solve the above-mentioned technical problem, this invention offers a fully automatic microscopic scanner, which comprises an image acquisition mechanism (IAM), a microscopic scanning mechanism, a stage mechanism and a light source arranged from top to bottom. The IAM is connected to the microscopic scanning mechanism where the IAM will, under the action of a power control mechanism, move in the directions of X-axis, Y-axis, and Z-axis, while the stage mechanism and light source mechanism are fixed and do not move.

The light source mechanism comprises a flat light source with a condenser. The flat light source is set directly below the tray of the stage mechanism. The light area of the flat light source is greater than or equal to the total area of the tray.

As an improvement of the present invention, the IAM adopts a line array camera, and the flat light source adopts a linear light source.

As a further improvement of the present invention, the light source mechanism further comprises a light source housing and a light source controller; the bottom of the light source housing is provided with a plurality of cooling fans; the flat light source is connected to the light source controller and is controlled by the controller for startup and shutdown.

As a further improvement of the present invention, a water cooling unit is provided around the side of the light source housing.

As a further improvement of the present invention, the distance between the flat light source and the bottom of the tray is 10 mm to 30 mm, and the brightness of the flat light source is not less than 800,000 lux.

As a further improvement of the present invention, the stage mechanism comprises a platform with a rotating mechanism at the center and a pair of ends, both ends of the platform are symmetrically provided with a tray for objects to be detected. Under the action of the rotating mechanism, the tray areas at both ends of the platform can be fixed directly above the light source mechanism.

As a further improvement of the present invention, it comprises a anianism and a laser pre-focus system connected thereto, wherein the general control mechanism is also connected with the IAMs, power control mechanisms and light source mechanism.

The laser pre-focus system comprises a laser range finder and a controller connected to the laser range finder. The laser range finder is positioned beside a lens barrel of the microscopic scanning mechanism to detect the height change of the surface of an object to be detected in the to-be-detected area of the scanning direction of the microscopic scanning mechanism. The detection value is sent to the controller.

The controller is configured to pre-measure a focal length parameter required when the microscopic scanning mechanism reaches the to-be-detected area after receiving the data transmitted by the laser range finder. The controller is also configured to transmit the focal length parameter to the general control mechanism.

After receiving the focal length parameter, the general control mechanism controls the power control mechanism to drive the microscopic scanning mechanism to achieve fast focusing.

As a further improvement of the present invention, the microscopic scanning mechanism is provided with the laser range finder on both sides of the lens barrel in the left and right moving directions.

As a further improvement of the present invention, the laser emission axis of the laser range finder is at an angle of 65 to 85 degrees in relation to the surface of the stage mechanism.

As a further improvement of the present invention, the power control mechanism comprises a Z-axis movement control unit, an X-axis movement control unit and a Y-axis movement control unit.

The Z-axis movement control unit comprises a Z-axis fixing block, a Z-axis fixing plate, a Z-axis ball screw and a Z-axis motor; one side of the Z-axis fixing block fixes the microscopic scanning mechanism, and its opposite side is fixedly provided with a Z-axis slider; in the middle of the Z-axis, the fixing block is provided with a Z-axis screw nut. The Z-axis fixing plate is used for fixing the Z-axis motor and the Z-axis ball screw, on which is provided with a pair of guide rails vertical to the Z-axis; the Z-axis slider matches the Z-axis guide rails; the Z-axis screw nut matches the Z-axis ball screw; the Z-axis ball screw is connected with the Z-axis motor; so the Z-axis ball screw will, under the action of the Z-axis motor, drive the Z-axis fixing block to move up and down relative to the Z-axis fixing plate, and further drive the microscopic scanning mechanism and the IAM to move up and down relative to the stage mechanism.

The X-axis movement control unit comprises an X-axis fixing plate, an X-axis ball screw and an X-axis motor. The X-axis fixing plate is used for fixing the X-axis motor and the X-axis ball screw, on which are provided with guide rails horizontal to the X-axis; on the Z-axis fixing plate, there are provided with the X-axis sliders and the X-axis screw nut; the X-axis slider matches the X-axis guide rails; the X-axis screw nut matches the X-axis ball screw; the X-axis ball screw is connected to the X-axis motor; and so the X-axis ball screw will, under the action of the X-axis motor, drive the Z-axis fixing plate to move leftwards and rightwards, and further drive the Z-axis movement control unit, the microscopic scanning mechanism and the IAM to move leftwards and rightwards relative to the stage mechanism;

The Y-axis movement control unit comprises a Y-axis fixing plate, a Y-axis support plate, a Y-axis ball screw and a Y-axis motor; the upper part of the Y-axis fixing plate is fixed the X-axis fixing plate vertically, and the lower part thereof are provided with a Y-axis slider and a Y-axis ball screw nut; the Y-axis support plate comprises two support plates parallel to each other; the two support plates are respectively and vertically provided at both ends of the Y-axis fixing plate, and on each two are provided with Y-axis guide rails; the Y-axis ball screw and the Y-axis motor are fixed onto either of the support plates, the Y-axis slider matches the Y-axis guide rails; the Y-axis screw nut matches the Y-axis ball screw; the Y-axis ball screw is connected to the Y-axis motor, so the Y-axis ball screw will, under the action of the Y-axis motor, drive the Y-axis fixing plate to move forwards and backwards, and further drive the X-axis movement control unit, the Z-axis movement control unit, the microscopic scanning mechanism and the IAM to move forwards and backwards relative to the stage mechanism.

As a further improvement of the present invention, the microscopic scanning mechanism comprises one or more microscopic scanning units which comprises a magnification-adjustable lens tube and a replaceable objective lens; the IAM comprises one or more line array cameras; the microscopic scanning units and the line array cameras are equal in quantity and mounted correspondingly one by one; each set of the microscopic scanning units and the line array cameras is connected to one set of the Z-axis movement control units respectively and is controlled by the corresponding Z-axis movement control unit separately.

As a further improvement of the present invention, the Y-axis movement control unit further comprises a Y-axis location sensor which is used to collect the location information of the Y-axis fixing plate along Y-axis guide rails.

The X-axis movement control unit further comprises an X-axis location sensor which is used to collect the location information of the Z-axis fixing plate along the X-axis guide rails.

As a further improvement of the present invention, the fully automatic microscopic scanner further comprises a base which is a hollow box, and in the hollow box is provided with the light source mechanism. An opening for fixing the stage mechanism is provided on the top plate of the box; the top plate of the box is also provided with a plurality of supports; the Y-axis support plate is fixedly provided onto the supports.

The fully automatic microscopic scanner further comprises an outer shield provided above the base, and the side wall of the outer shield is provided with a display screen and an opening for exchanging the loading tray of the stage mechanism; and the display screen is connected to the general control mechanism.

The invention also provides a fully automatic microscopic scanner, comprising an IAM, a microscopic scanning mechanism, a stage mechanism, and a light source mechanism arranged in turn from top to bottom. The IAM is connected to the microscopic scanning mechanism, which is characterized in that the IAM adopts a line array camera, the microscopic scanning mechanism and the IAM are moved in X-axis, Y-axis and Z-axis directions under the action of a power control mechanism; and the stage mechanism and the light source mechanism are fixed and not moved;

The light source mechanism comprises a flat light source with a condenser, the light source mechanism is connected with a power control mechanism and controlled by the power control mechanism which achieves the linkage of the microscopic scanning mechanism and the IAM in the X-axis and Y-axis directions.

As a further improvement of the present invention, the light source mechanism further comprises a light source housing and a light source controller; the bottom of the light source housing is provided with a plurality of cooling fans; the flat light source is connected to the light source controller and is controlled by the controller for startup and shutdown.

As a further improvement of the present invention, it comprises a general control mechanism and a laser pre-focus system connected thereto, wherein the general control mechanism is also connected with the IAMs, power control mechanisms, and light source mechanism.

The laser pre-focus system comprises a laser range finder and a controller connected to the laser range finder. The laser range finder is disposed beside a lens barrel of the microscopic scanning mechanism for detecting the height change of the surface of object to be detected in the to-be-detected area in scanning direction of the micro scanning mechanism and the detection value is sent to the controller;

The controller is configured to pre-measure a focal length parameter required when the microscopic scanning mechanism reaches the to-be-detected area after receiving the data transmitted by the laser range finder and transmits the focal length parameter to the general control mechanism.

After receiving the focal length parameter, the general control mechanism controls the power control mechanism to drive the microscopic scanning mechanism to achieve fast focusing.

As a further improvement of the present invention, the microscope scanning mechanism is provided with the laser range finder on both sides of the lens barrel in the left and right moving directions; laser emission axis of the laser range finder is at an angle of 65 to 85 degrees in relation to the surface of the stage mechanism.

As a further improvement of the present invention, the power control mechanism comprises a Z-axis movement control unit, an X-axis movement control unit and a Y-axis movement control unit.

The Z-axis movement control unit comprises a Z-axis fixing block, a Z-axis fixing plate, a Z-axis ball screw and a Z-axis motor; one side of the Z-axis fixing block fixes the microscopic scanning mechanism, and its opposite side is fixedly provided with a Z-axis slider; in the middle of the Z-axis fixing block is provided with a Z-axis screw nut, the Z-axis fixing plate is used for fixing the Z-axis motor and the Z-axis ball screw, on which is provided with a pair of guide rails vertical to the Z-axis; the Z-axis slider matches the Z-axis guide rails; the Z-axis screw nut matches the Z-axis ball screw; the Z-axis ball screw is connected with the Z-axis motor; so the Z-axis ball screw will, under the action of the Z-axis motor, drive the Z-axis fixing block to move up and down relative to the Z-axis fixing plate, and further drive the microscopic scanning mechanism and the IAM to move up and down relative to the stage mechanism;

The X-axis movement control unit comprises an X-axis fixing plate, an X-axis ball screw and an X-axis motor. The X-axis fixing plate is used for fixing the X-axis motor and the X-axis ball screw, on which are provided with guide rails horizontal to the X-axis; on the Z-axis fixing plate are provided with the X-axis sliders and the X-axis screw nut; the X-axis slider matches the X-axis guide rails; the X-axis screw nut matches the X-axis ball screw; the X-axis ball screw is connected to the X-axis motor; and so the X-axis ball screw will, under the action of the X-axis motor, drive the Z-axis fixing plate to move leftwards and rightwards, and further drive the Z-axis movement control unit, the microscopic scanning mechanism and the IAM to move leftwards and rightwards relative to the stage mechanism.

The Y-axis movement control unit comprises a Y-axis fixing plate, a Y-axis support plate, a Y-axis ball screw and a Y-axis motor; the upper part of the Y-axis fixing plate is fixed the X-axis fixing plate vertically, and the lower part thereof are provided with a Y-axis slider and a Y-axis ball screw nut. The Y-axis support plate comprises two support plates parallel to each other; the two support plates are respectively and vertically provided at both ends of the Y-axis fixing plate, and on each two are provided with Y-axis guide rails; the Y-axis ball screw and the Y-axis motor are fixed onto either of the support plates, the Y-axis slider matches the Y-axis guide rails; the Y-axis screw nut matches the Y-axis ball screw; the Y-axis ball screw is connected to the Y-axis motor, so the Y-axis ball screw will, under the action of the Y-axis motor, drive the Y-axis fixing plate to move forwards and backwards, and further drive the X-axis movement control unit, Z-axis movement control unit, the microscopic scanning mechanism and the IAM to move forwards and backwards relative to the stage mechanism.

As a further improvement of the present invention, the microscopic scanning mechanism comprises two microscopic scanning units, the IAM comprises two line array cameras; the microscopic scanning units and the line array cameras mounted correspondingly one by one; each set of the microscopic scanning units and the line array cameras is connected to one set of the Z-axis movement control units respectively and is controlled by the corresponding Z-axis movement control unit separately.

The two groups of microscopic scanning units and line array cameras correspond to two rows of items to be detected respectively. The linear light source is in the form of a long bar and the length direction thereof is perpendicular to the two rows of items to be detected. Under the effect of power control mechanism, the two groups of microscopic scanning units and the line array camera cooperate with the light source mechanism to simultaneously scan the two rows of items to be detected.

With such a design, the present invention has at least the following advantages:

1. The present invention adopts a linear array camera and a power control mechanism to flexibly adjust the linear array camera and the microscopic scanning mechanism so that it can move forward and backward, left and right, and up and down, expand the microscopic scanning range and increase the scanning efficiency. By setting a long linear light source with a flat condenser lens, the effective area of irradiation is much larger than that of the traditional optical path, making the automatic microscope scanner achieve large-area high-speed scanning.

2. The present invention, by improving the light source mechanism, demonstrates a variety of heat-dissipating channels. This results in effective dissipation of heat that is generated by large-area, high-brightness and near-distance light sources and provides significant innovations to improve the quality of scanned images. In addition, it provides a favorable guarantee for high-speed scanning efficiency.

3. The present invention also sets a laser pre-focus system to ascertain the focal length parameters of the detected area in advance of the scanning process. The laser pre-focus system realizes fast focusing of microscopic scanning mechanism through the cooperation of a controller and a mechanical component resulting in faster slides scanning and clearer scanning of pictures, greatly improving the scanning rate and scanning quality.

4. The present invention also improves the setting angle of the laser range finder in the laser pre-focus system, so that when the laser range finder is set vertically, it will not mistake the cover glass surface on the stage mechanism as the surface of the detected item at the bottom of the cover glass during the distance measurement, making the reading inaccurate, resulting in an inability to obtain an accurate focal length parameter. This improvement can greatly increase the accuracy of the measurement of the focal length parameter.

5. This invention, by setting up one or more lenses and one or more line array cameras, can achieve simultaneous scanning of multiple slides so that the scanning speed is thus further enhanced, which is several times or dozens of times that of the existing scanning equipment. The scanning efficiency is enhanced as the time required to replace slide is reduced.

6. In this invention, the power control mechanism by setting multiple sets of ball screw power regulation mechanisms achieves the movement of the microscopic scanning mechanism and the IAM along X/Y/Z axis easily and flexibly. The principle behind it is simple. It is easy to control and implement.

7. The fact that multiple slides (the multiple slides are deemed as a whole) start and end simultaneously the scanning process in the present invention, completely solves the problem of low efficiency under the traditional model in which another slide might be scanned only after one slide is over. Solving the problem of automatic slide placement is not enough. A series of improvements to the optical path, light source and shooting camera of the traditional microscope are required to increase the scanning efficiency of the present invention to several times better than that of the existing technology. Besides, a variety of uncertainties brought by the automatic slide-feeding mechanism might be avoided.

However, the present invention also improves the stage mechanism so that the stage mechanism can be fixed during scanning to improve the scanning quality, save the feeding time, improve the scanning efficiency and overcome all kinds of defects on existing automatic feeding mechanism.

8. The design of two or more microscopic scanning units fitted with lenses of different magnifications in this invention satisfies the need to simultaneously scan in different magnifications, which greatly facilitates the ease of use for the customers.

9. This invention changes completely the movement mode of the traditional microscopes—the items to be scanned will move, but not the lens. Through this completely new movement mode the invention solves the problem that conventional microscopic scanners have when scanning fluid objects by keeping the stage mechanism fixed and providing a power control mechanism to achieve the flexible regulation of the lens of the microscopic scanning mechanism.

10. The present invention also provides a more favorable condition for scanning a larger area of the pathological slides by setting a scanning mode in which the micro scanning unit and the line array camera are linked with the light source mechanism. The technical purpose of saving cost and quick scanning can also be achieved by setting two groups of microscopic scanning units and a linear array camera to link a linear light source corresponding to the scan modes of two rows of items to be detected.

BRIEF DESCRIPTION OF THE DRAWINGS

The above-mentioned contents are only an overview of the technical solution of the present invention. In order to understand more clearly the technical means of the invention, the present invention will be described in further details through the combination of the drawings and specific embodiments.

In the drawings, like elements are depicted by like reference numerals. The drawings are briefly described as follows.

Figure 1:
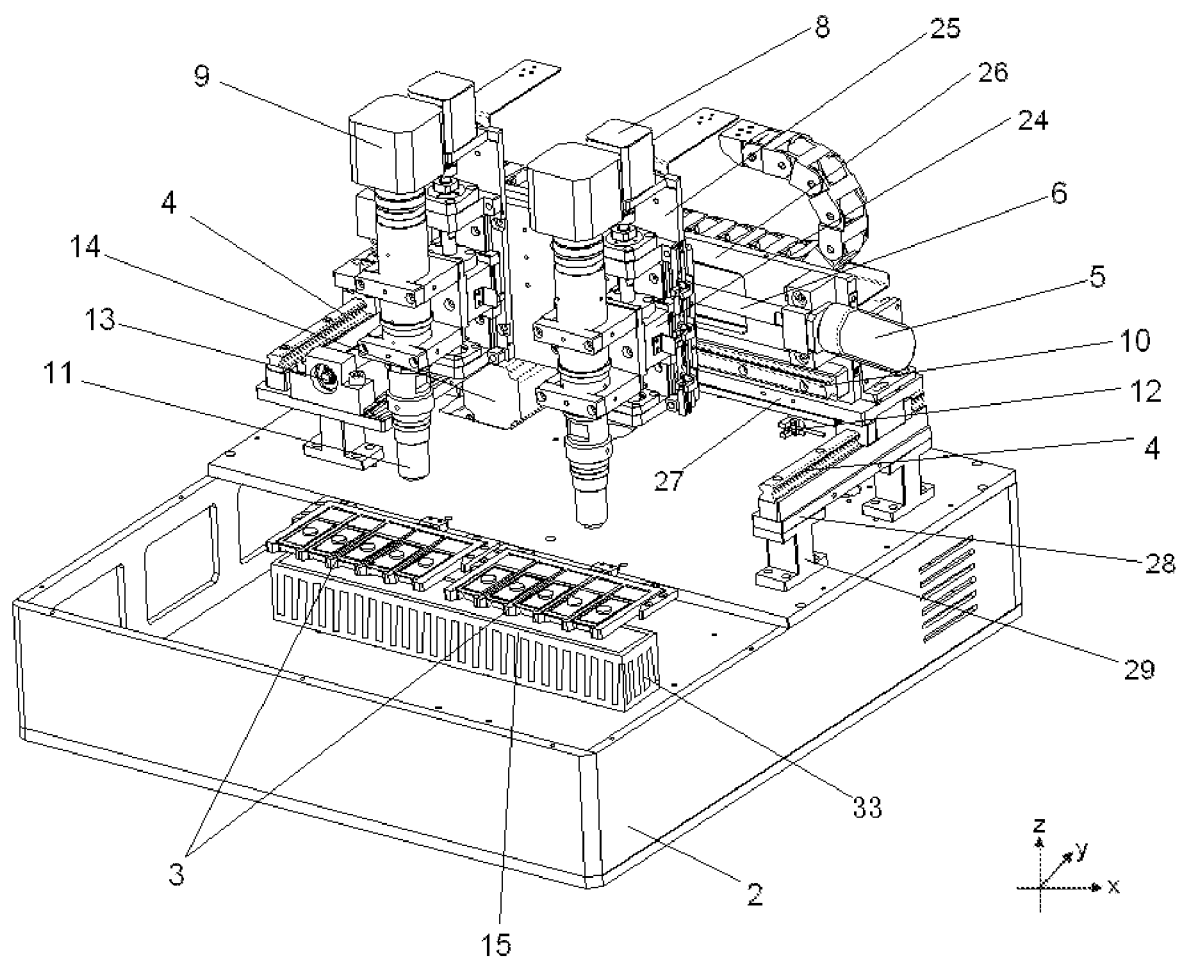
FIG. 1 is a dimensional structure diagram of one embodiment of the fully automatic microscopic scanner of this invention.
Figure 2:
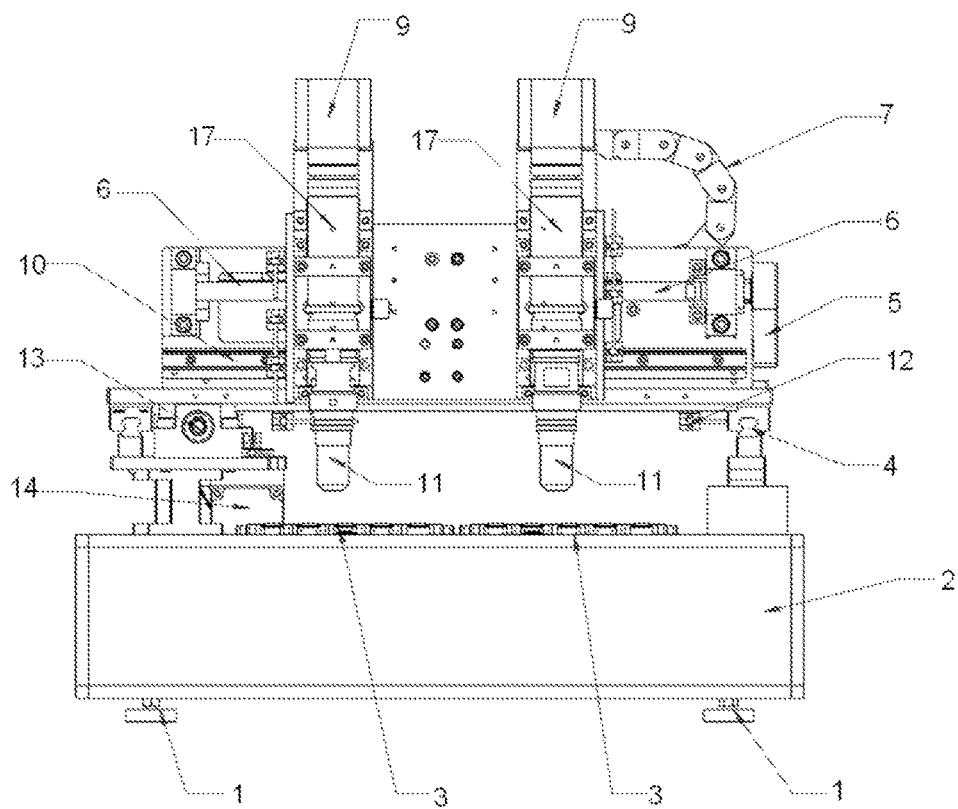
FIG. 2 is a front view of the structure of the fully automatic microscopic scanner shown in FIG. 1.
Figure 3:
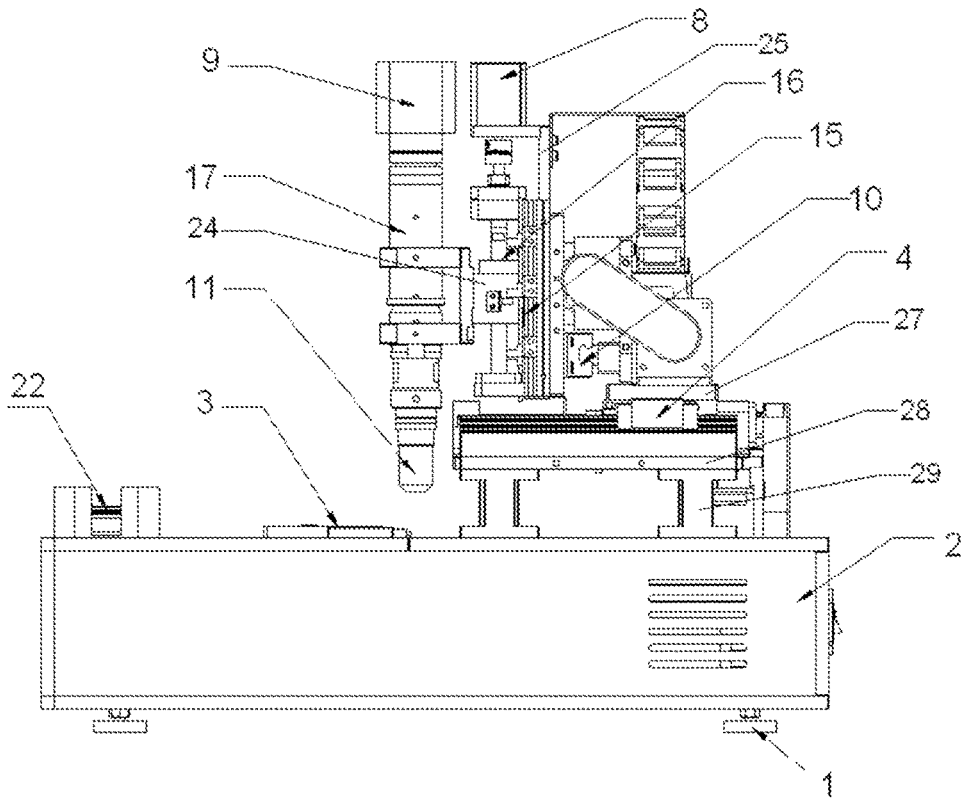
FIG. 3 is a right view of the structure of the fully automatic microscopic scanner shown in FIG. 1.
Figure 4:
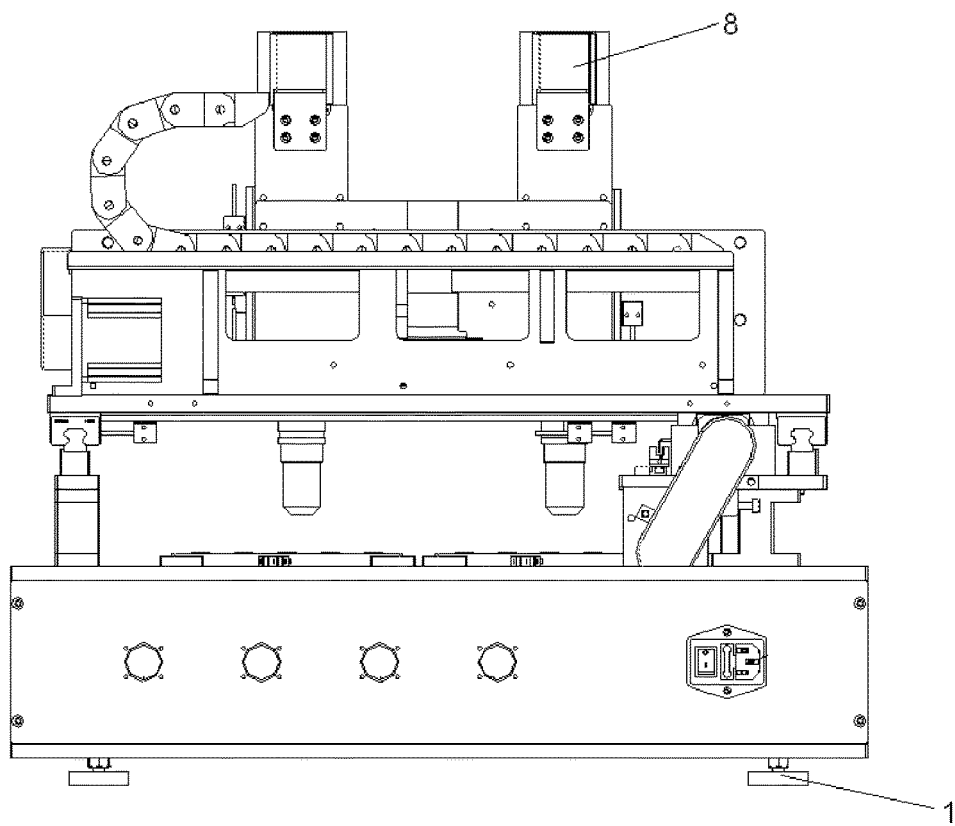
FIG. 4 is a rear view of the structure of the fully automatic microscopic scanner shown in FIG. 1.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Embodiment 1

As shown in FIGS. 1-4, the fully automatic microscopic scanner in this embodiment comprises an image acquisition mechanism (IAM) 9, a microscopic scanning mechanism, a stage mechanism 3 and a light source mechanism 15. The IAM 9 adopts a line array camera to enable rapid scanning of pathological slides.

The microscopic scanning mechanism comprises a lens tube 17 capable of adjusting magnification and a replaceable lens 11. The IAM 9 is connected to the lens tube 17, with the replaceable lens 11 being above the stage mechanism 3, and the light source mechanism 15 being right below the stage mechanism 3.

In this embodiment, the stage mechanism 3 and the light source mechanism 15 are fixed, and the microscopic scanning mechanism and the IAM 9 can, under the action of a power control mechanism, move along X-axis, Y-axis, and Z-axis, that is, the replaceable lens 11 can move leftwards and rightwards, forwards and backwards, up and down, relative to the stage mechanism 3, so as to expand the scanning scope of the fully automatic microscopic scanner, and improve the scanning efficiency. As the light source and the pathological slides to be scanned remain unmoved, the quality of the image acquired by the IAM 9 can be greatly improved.

Specifically, the power control mechanism of this embodiment comprises a Z-axis movement control unit, an X-axis movement control unit and a Y-axis movement control unit.

The Z-axis movement control unit is used to drive the microscopic scanning mechanism and the IAM 9 to move up and down relative to the stage mechanism 3, and comprises a Z-axis fixing block 24, a Z-axis fixing plate 25, a Z-axis ball screw 16 and a Z-axis motor 8. One side of the Z-axis fixing block 24 fixes the microscopic scanning mechanism, and its opposite side is fixedly provided with a Z-axis slider. In the middle of the Z-axis fixing block 24 is provide with a Z-axis screw nut. The Z-axis fixing plate 25 is used to fix the Z-axis motor 8 and the Z-axis ball screw 16 and on top of it, there is provided with Z-axis guide rails in up-and-down direction. The Z-axis slider matches the Z-axis guide rails. The Z-axis screw nut matches the Z-axis ball screw 16. The Z-axis ball screw 16 is connected to the Z-axis motor 8. The Z-axis ball screw 16 will, under the action of the Z-axis motor 8, drive the Z-axis fixing block 24 to move up and down relative to the Z-axis fixing plate 25, and further drive the microscopic scanning mechanism and the IAM to move up and down, that is, to realize upwards and downwards movement of the replaceable lens 11 of the microscopic scanning mechanism relative to the stage mechanism 3.

The X-axis movement control unit is used to drive the Z-axis movement control unit to move leftwards and rightwards relative to the stage mechanism 3 and comprises an X-axis fixing plate 26, an X-axis ball screw 6 and an X-axis motor 5. The X-axis fixing plate 26 is used to fix the X-axis motor 5 and the X-axis ball screw 6 and on top of it there is provided with X-axis guide rails 10 in horizontal to the X-axis. On the Z-axis fixing plate 25 are fixedly provided with an X-axis slider and an X-axis screw nut. The X-axis slider matches the X-axis guide rails 10. The X-axis screw nut matches with the X-axis ball screw 6. The X-axis ball screw 6 is connected to the X-axis motor 5. The X-axis ball screw 6 will, under the action of the X-axis motor 5, drive the Z-axis fixing plate 25 to move leftwards and rightwards, and further drive the Z-axis movement control unit, the microscopic scanning mechanism and the IAM to move leftwards and rightwards, that is, to realize leftward and rightward movement of the replaceable lens 11 of the microscopic scanning mechanism relative to the stage mechanism 3. Besides, in this embodiment the X-axis movement control unit further comprises an X-axis drag chain 7 that is connected to the Z-axis fixing plate 25, which is used to better control leftward and rightward movement of the Z-axis fixing plate 25 along the X-axis guide rails 10.

The Y-axis movement control unit is used to drive the X-axis movement control unit to move forwards and backwards relative to the stage mechanism 3 and comprises a Y-axis fixing plate 27, a Y-axis support plate 28, a Y-axis ball screw 13 and a Y-axis motor 14. The upper part of the Y-axis fixing plate 27 is fixes vertically the X-axis fixing plate 26 and at the lower part of it are provided with a Y-axis slider and a Y-axis screw nut. The Y-axis support plate 28 comprises two support plates parallel to each other, which are respectively provided at both ends of the Y-axis fixing plate 27, and on which are all provided with Y-axis guide rails 4. The Y-axis ball screw 13 and the Y-axis motor 14 are fixed to either of the support plates. The Y-axis slider matches the Y-axis guide rails 4. The Y-axis screw nut matches the Y-axis ball screw 13. The Y-axis ball screw 13 is connected to the Y-axis motor 14, so that the Y-axis ball screw 13 will, under the action of the Y-axis motor 14, drive the Y-axis fixing plate 27 to move forwards and backwards, and further drive the Y-axis movement control unit, the Z-axis movement control unit, the microscopic scanner and the IAM 9 to move forwards and backwards, that is, to realize forward and backward movement of the replaceable lens 11 of the microscopic scanning mechanism relative to the stage mechanism 3. Of course, the Z-axis movement control unit, the X-axis movement control unit and the Y-axis movement control unit in this embodiment may also adopt other existing mechanical transmission mechanisms to realize upward and downward, leftward and rightward, and forward and backward movement of the microscopic scanning mechanism and the IAM 9.

To further control forward and backward movement of the replaceable lens 11 of the fully automatic microscopic scanning mechanism, the Y-axis movement control unit further comprises a Y-axis sensor 12 which is provided below the Y-axis fixing plate 27 and is used to collect location information of the Y-axis fixing plate 27 along the Y-axis guide rails 4.

To further control leftward and rightward movement of the replaceable lens 11 of the fully automatic microscopic scanner, the X-axis movement control unit further comprises an X-axis sensor which is provided below the Z-axis fixing plate 25 and is used to collect location information of the Z-axis fixing plate 25 along the X-axis guide rails 10.

To further improve the scanning efficiency, the fully automatic microscopic scanner comprises one or more microscopic scanning units. The IAM 9 comprises one or more cameras, line array cameras preferably. The microscopic scanning units and the line array cameras are equal in quantity and set up one by one correspondingly. Each set of the microscopic scanning units and the line array cameras is respectively connected to one set of Z-axis movement control units, and is controlled separately by corresponding Z-axis movement control units.

In this embodiment, the microscopic scanning mechanism comprises two microscopic scanning units. The IAM 9 comprises two line array cameras. These two microscopic scanning units and the two line array cameras are set corresponding to each other one by one. Each set of the microscopic scanning units and the line array camera is connected to one set of the Z-axis movement control units, and is controlled separately by corresponding Z-axis movement control units.

Figure 5:
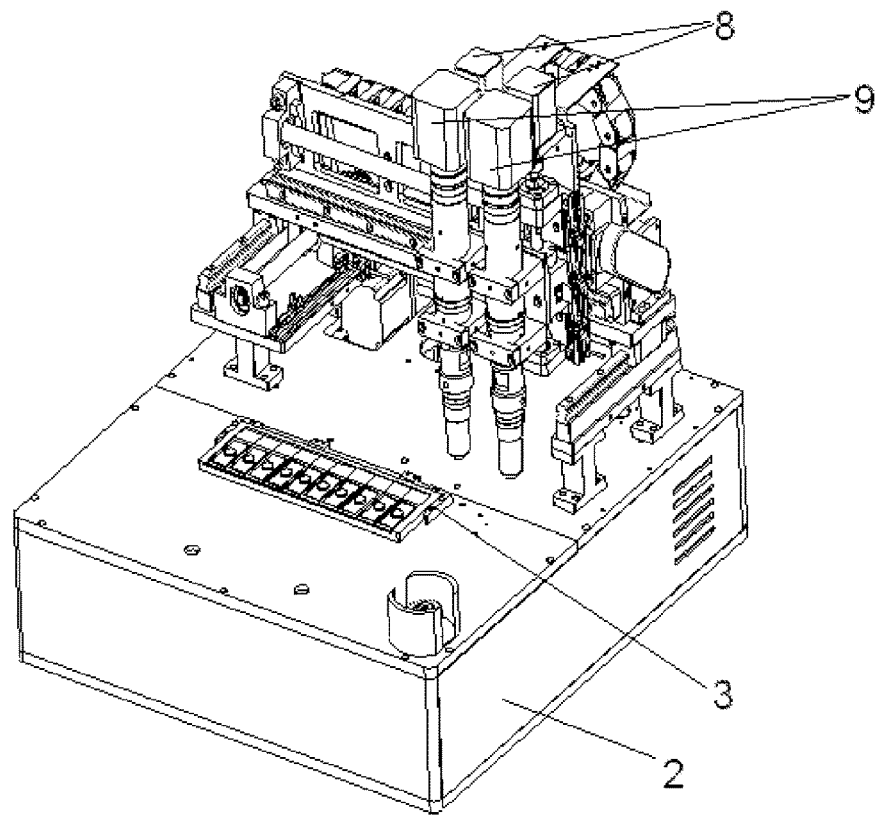
FIG. 5 is a schematic three-dimensional structure diagram of two adjacent Z-axis movement control units arranged in the fully automatic microscopic scanner of the present invention.

Of course, these two sets of the Z-axis movement control units may be set at some distance so that the items to be scanned on the tray below might be scanned simultaneously; these two sets of the Z-axis movement control units might also be adjacently set so that the replaceable lens 11 of the two microscopic scanning units may be mounted with lenses of different magnifications, such as lens of 20× and 40×. In such case, under action of the X-axis movement control unit, it is ok to select only one set of microscopic scanning units to scan the objects to be scanned, as shown in FIG. 5.

In this embodiment, the object stage mechanism 3 comprises one or more material trays, the tray comprises multiple placement points for slides so that simultaneous scanning of multiple pathological slides might be accomplished via the fully automatic microscopic scanner.

Figure 8:
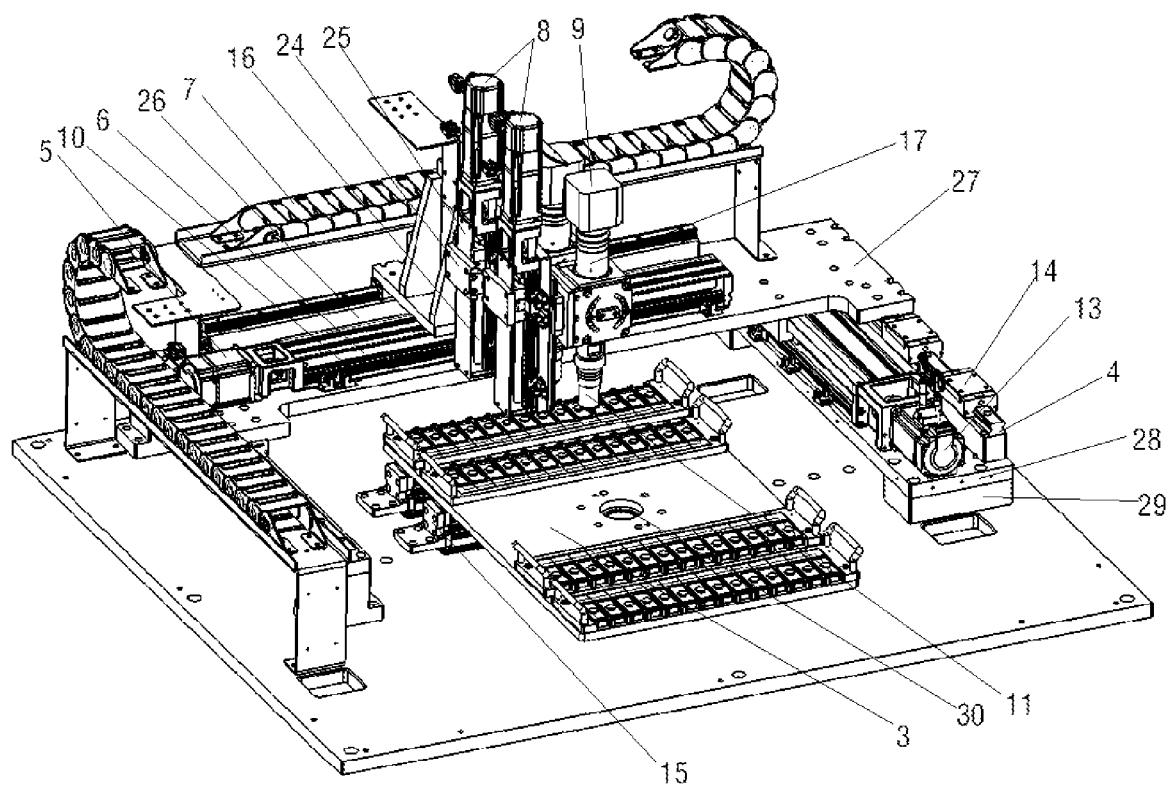
FIG. 8 is a dimensional structure diagram of the rotatable stage mechanism of the automatic microscopic scanner of the present invention.

As shown in FIG. 8, the stage mechanism 3 adopts a platform provided with a rotating mechanism at the center 30. Both ends of the platform are symmetrically provided with a tray area on which slides are placed. Under the action of the rotating mechanism, the tray areas at both ends of the platform can be fixed in succession above the light source mechanism 15. In this way, when the tray area on one side of the platform is scanned, the tray area on the other side can be loaded. After the tray area on one side is scanned, the tray area on the other side is rotated to right above the light source mechanism 15 under the effect of the rotating mechanism at the center 30 and immediately starts scanning to improve scanning efficiency. The improvement of the stage mechanism 3 not only enables the stage mechanism 3 to be fixed during scanning, improves the scanning quality, but also saves the feeding time, improves the scanning efficiency and overcomes various defects caused by the existing automatic slide-feeding mechanism.

Figure 6:
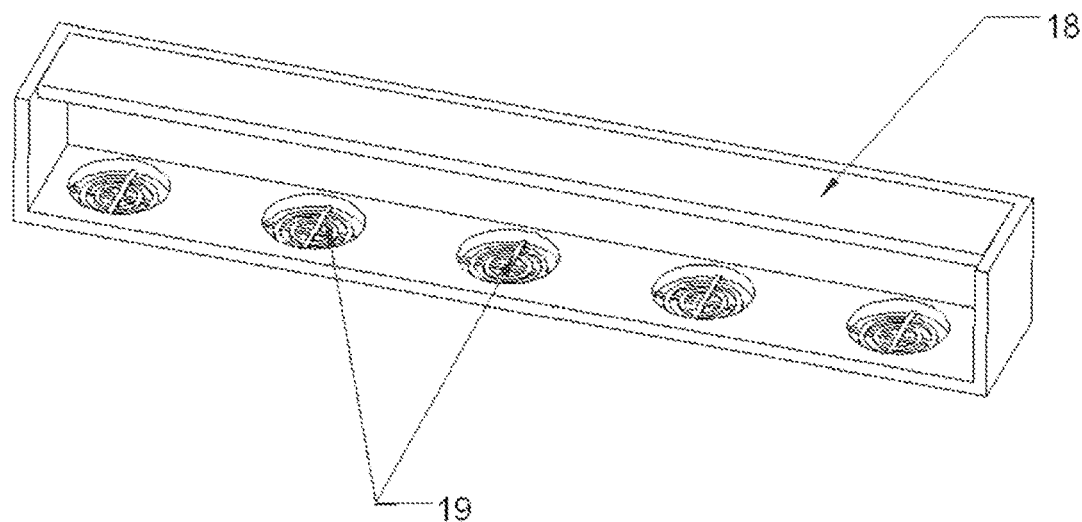
FIG. 6 is a front view of the light source mechanism of the fully automatic microscopic scanner of this invention.

In order to adapt to the rapid wide-range scanning of the line array camera in the above-mentioned automatic microscopic scanner, the present invention is provided with its associated light source mechanism 15 to obtain a clear image. As shown in FIG. 6, The light source mechanism 15 comprises a light source body, a light source housing and a light source controller. The light source body adopts a flat light source 18 with a condenser which is provided at the top of the light source housing. At the bottom of the light source housing are provided with multiple cooling fans 19 which are used to radiate heat for the light source body. The flat light source 18 adopts a rectangular structure, the light source area of this rectangular structure is greater than or equals to the total area of the tray of the stage mechanism 3, that is, the flat light source 18 is provided right below the tray of the stage mechanism 3. The light source controller is connected to the flat light source 18 for control of its startup and shutdown.

In this embodiment, the effective illumination area of the flat light source 18 is not less than 50 to 300 mm, the brightness thereof is not less than 800,000 lux and the distance from the bottom of the tray is only 10 mm to 30 mm. In this way, since the flat panel light source has large area, high brightness, and close distance, relatively high calorific value is generated. If the high-calorie heat-removing treatment is not performed in time, the focusing of the detected item under a high-power microscope may be seriously affected. Therefore, in this embodiment, a water-cooling unit 33 is provided around the side of the light source housing. The water-cooling unit 33 and the plurality of cooling fans 19 together effectively solve the problem of high heat caused by the large light source.

The fully automatic microscopic scanner further comprises a general control mechanism which is connected to the IAM 9, the power control mechanism and the light source controller, for controlling the movement execution of them based upon the actual needs and accomplishing rapid scanning and digital image collection of the scanned slides.

In order to better adapt to the rapid scanning of the line array camera to obtain a clear image, the fully automatic microscopic scanner also includes a laser pre-focus system connected to a general control mechanism.

Figure 9:
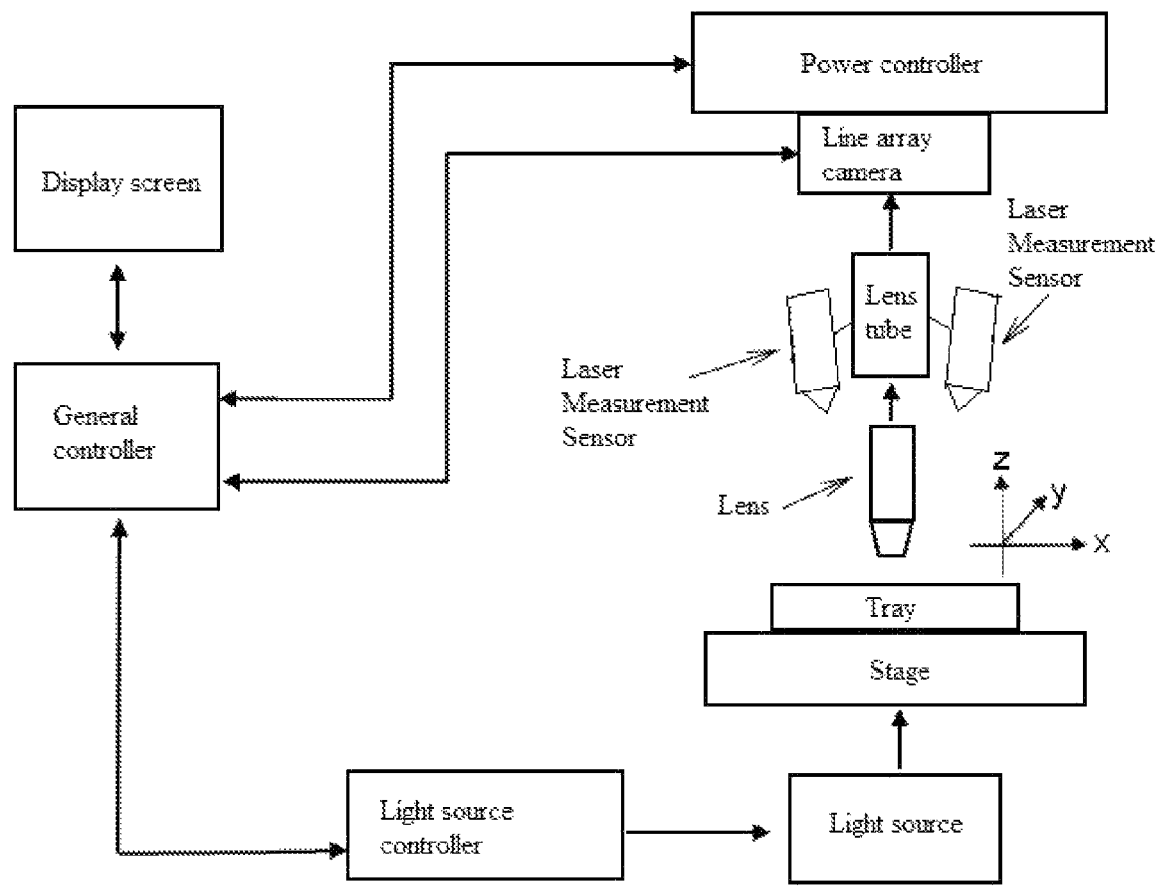
FIG. 9 is a working principle diagram of the first embodiment of the automatic microscopic scanner of the present invention.

As shown in FIG. 9, the laser pre-focus system comprises a laser range finder and a controller connected to the laser range finder. The laser range finder is disposed beside a lens barrel of the microscopic scanning mechanism for detecting the height change of the surface of object to be detected in the to-be-detected area in scanning direction of the micro scanning mechanism and the detection value is sent to the controller;

The controller is configured to pre-measure a focal length parameter required when the microscopic scanning mechanism reaches the to-be-detected area after receiving the data transmitted by the laser range finder and transmit the focal length parameter to the general control mechanism; The general control mechanism controls the power control mechanism to drive the microscopic scanning mechanism to achieve fast focusing on Z axial. The laser pre-focus system can well realize the continuous pre-calculation of focal length parameters of the detected area to be scanned during the rapid scanning and slicing process of the fully automatic microscopic scanner and can quickly focus and finally get clear picture in the fast scanning mode.

As a further improvement of the present invention, the laser range finder is arranged on both sides of the lens barrel 17 in the direction of the left and right movements of the microscopic scanning mechanism, so that the microscopic scanning mechanism can pre-measure the focal length parameter in the detected area whether it moves left or right on the X-axis to achieve more convenient, effective and rapid slides scanning.

As a further improvement of the present invention, the setting direction of the laser range finder in this embodiment is as follows: the laser emission axis of the laser range finder and the slicing surface of the stage mechanism 3 are angled between 65 and 85 degrees, so that when the laser range finder is set vertically, it will not mistake the cover glass surface on the stage mechanism 3 as the surface of the detected item at the bottom of the cover glass during the distance measurement, making the reading inaccurate, resulting in an inability to obtain an accurate focal length parameter.

Figure 7:
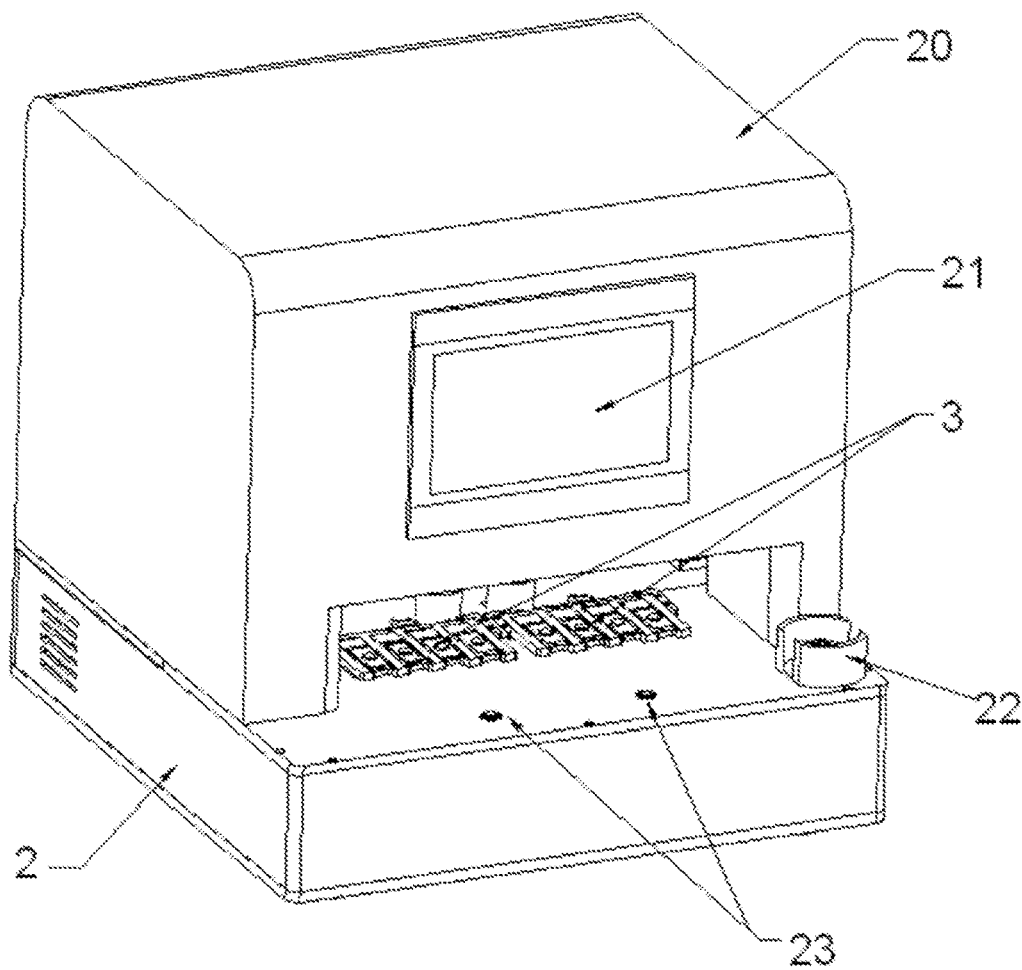
FIG. 7 is an overall structure diagram of the fully automatic microscopic scanner of this invention.

As shown in FIG. 1 and FIG. 7, the fully automatic microscopic scanner comprises a base 2 which is a hollow box, in the box is fixedly provided with the light source mechanism 15; At the top plate of the box there is an opening provided to fix the stage mechanism 3; on the top plate of the box are also provided with multiple supports 29, and the Y-axis support plate 28 is fixedly provide onto the supports 29. The microscopic scanning mechanism and the IAM 9 are fixed on the top plate of the base 2 via the power control mechanism. On the top surface of the base 2 are provided with a start button 23 and an emergency stop button 22. Both the start button 23 and the emergency stop button 22 are connected to the above-mentioned general control mechanism to achieve the operation of the fully automatic microscopic scanner.

As a preferred embodiment, there is an adjustable foot padding 1 at the bottom of the hollow box, which is used to adjust the scanner to be in horizontal state to facilitate the acquisition of scanning data.

In order to protect the IAM 9, the microscopic scanning mechanism and the power control mechanism, the fully automatic microscopic scanner further comprises an outer shield 20 mounted above the base 2, and on the side wall of the outer shield 20 are provided with a display screen 21 and an opening for adjusting the feeding tray of the stage mechanism 3. The display screen 21 is connected to the above-mentioned general control mechanism for displaying the image data acquired by the line array camera, as well as the operating state of the power control mechanism and the light source mechanism 15.

As shown in FIG. 9, the working principle of the fully automatic microscopic scanner in this invention is as follows: the stage mechanism 3 and the light source mechanism 15 of the microscopic scanner remain fixed and not moved, while the microscopic scanning mechanism and the IAM 9 will, under the action of the power control mechanism, achieve movement along X-axis, Y-axis, and Z-axis, that is, the replaceable lens 11 will move leftwards and rightwards, forwards and backwards, up and down relative to the stage mechanism 3, and achieve the control to the line array cameras, the power control mechanism and the light source controller based upon the actual demands under the action of the general control mechanism, and further achieve the fast microscopic scanning of multiple rows of detected slides, The laser pre-focus system also predicts the focal length parameters of the object to be detected in the forward direction of the lens, which improves the scanning quality and speed more quickly and effectively and displays the image acquisition results in real time through the display screen. The detection speed is high, the detection quality is excellent, and the efficiency is high.

Embodiment 2

Figure 10:
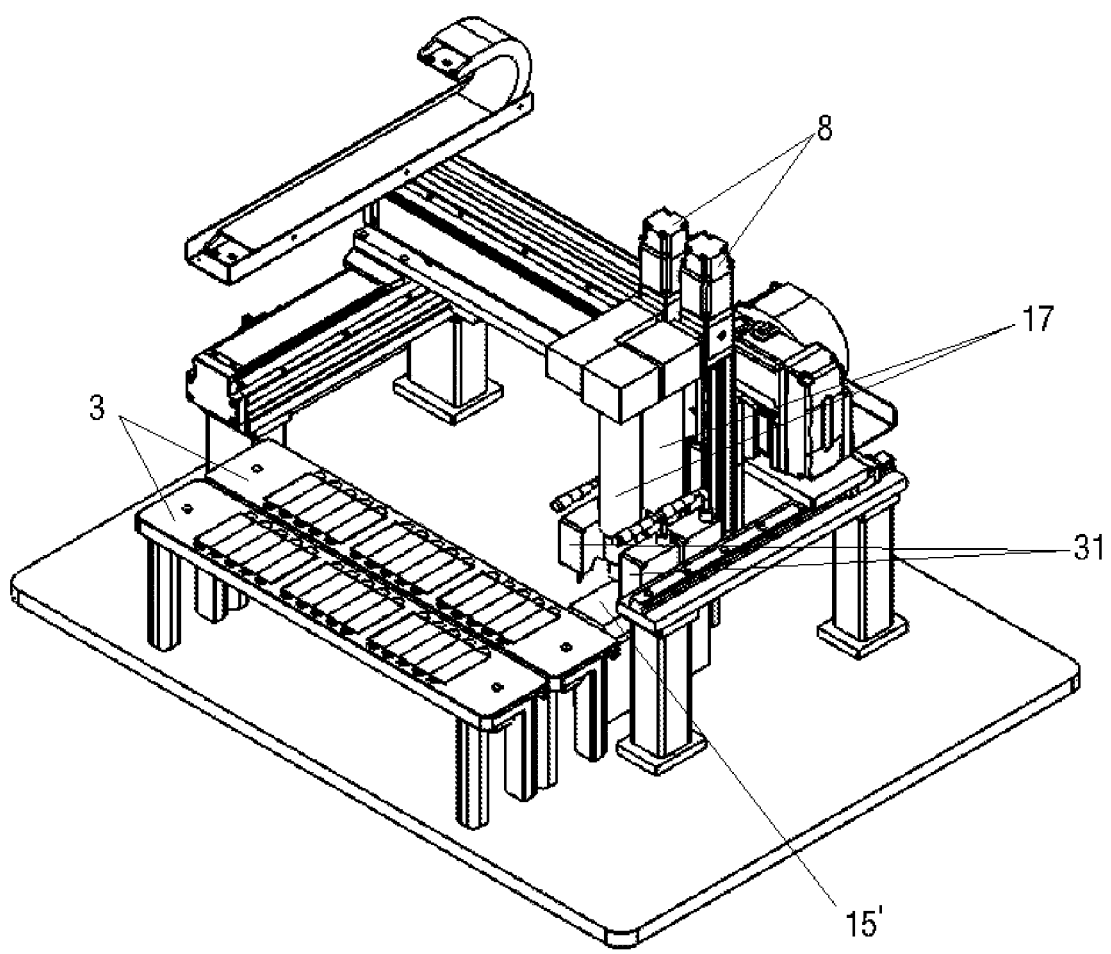
FIG. 10 is a dimensional structure diagram of the light source mechanism linked with the microscopic scanning unit in the fully automatic microscopic scanner of the present invention.
Figure 11:
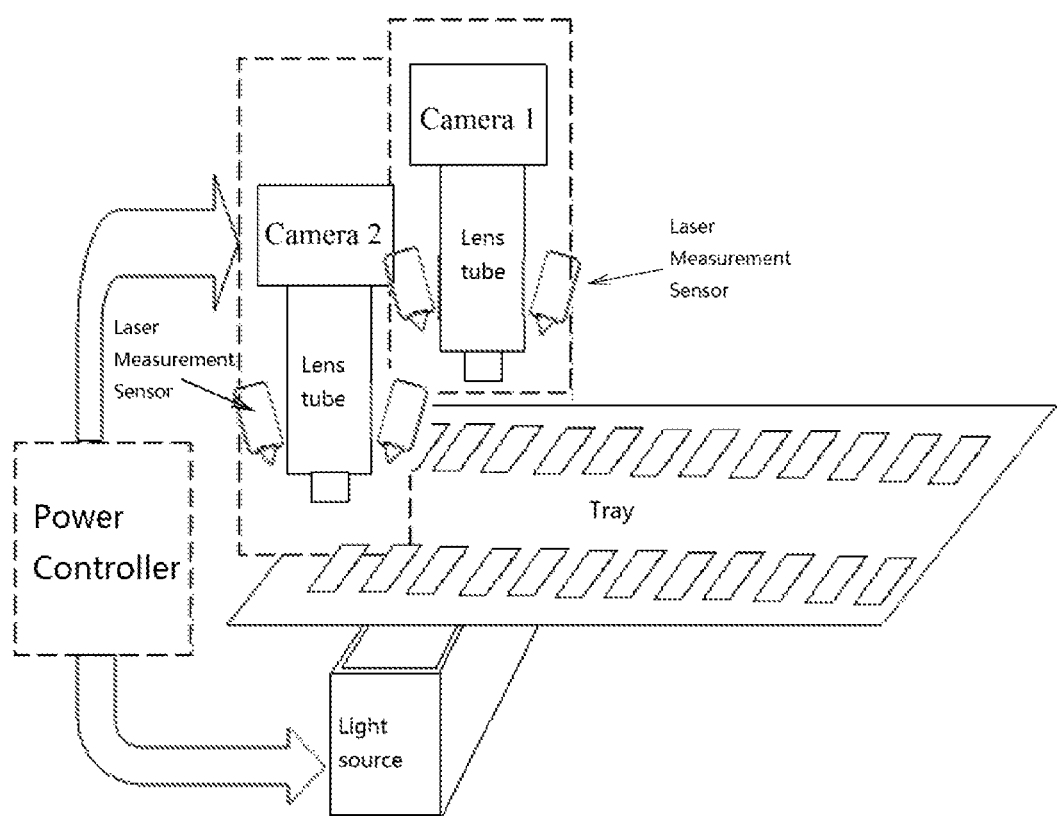
FIG. 11 is a working principle diagram of the second embodiment of the automatic microscopic scanner of the present invention.

As shown in FIGS. 10 and 11, the difference between the present embodiment and the first embodiment is that the light source mechanism 15' of the fully automatic microscopic scanner is connected with a power control mechanism and controlled by the power control mechanism which achieves the linkage of the microscopic scanning mechanism and the IAM in the X-axis and Y-axis directions.

Specifically, in the present embodiment, the light source mechanism 15' is connected to the Z-axis fixing plate through the connecting plate and when the X-axis ball screw is driven by the X-axis motor to drive the Z-axis fixing plate to move left and right, the Z axis fixing plate will drive the light source mechanism 15' and the Z-axis movement control unit, the microscopic scanning mechanism and the IAM to perform a left-right movement relative to the stage mechanism 3. In addition, when the Y-axis ball screw is driven by the Y-axis motor and the Y-axis fixing plate is moved back and forth, the Y-axis fixing plate will drive the light source mechanism 15', the X-axis movement control unit, and the Z-axis movement control unit, the microscope scanning mechanism and the IAM to move back and forth relative to stage mechanism 3. Then, the linkage between the light source mechanism 15', the microscopic scanning mechanism and the IAM is realized and favorable conditions are provided for realizing a larger area of the pathological slides scanning.

In addition, when the fully automatic microscopic scanner has above two microscopic units, the two microscopic scanning units and the line array camera correspond to two rows of items to be detected and only the linear light source is set to be strip structure at this time. Its length direction is set to be perpendicular to the two rows of the items to be detected. Under the action of a power control mechanism, the two groups of microscopic scanning units and the line array camera can be linked to the one linear light source simultaneously to scan two rows of items to be detected, saving the cost of the light source.

The automatic microscopic scanner described above can achieve simultaneous scanning of multiple pathological slides by providing two or more microscopic scanning mechanisms and two or more corresponding line array cameras, multiple trays, and a large-area light source mechanism. In the work, only the movement of the power control mechanism can be pre-set according to the arrangement of loading slides on the stage mechanism. In combination with the detection of the laser pre-focus system, a highly efficient automatic microscopic scan can be achieved. The efficiency of scanning more than 30 slides at a time provides powerful support for the statistics and analysis of pathological slides under big data. Due to the unique design of the light source mechanism, the scanning speed and the scanning quality of the image collection mechanism are greatly improved, so that the scanning speed of the automatic microscopic scanner is fast, and the scanning quality is high.

This invention is easy not only to replace the feeding tray on the stage mechanism but also, beside scanning pathological slides, to replace the feeding tray used for other custom scanning (such as 96-well plates, etc.). It is beyond the capacity of the current automatic feeding microscopic scanner.

The above description discloses preferred embodiments of the present invention, but not intended to restrict the invention, in any way. Simple changes, equivalent changes or modifications made by technical persons of ordinary skill in the field on the basis of the disclosed above shall fall within the protective scope of the present invention.

The disclosure is illustrated by example in the drawing figures, and throughout the written description. It should be understood that numerous variations are possible, while adhering to the inventive concept. Such variations are contemplated as being a part of the present disclosure.

What is claimed is:
1. A fully automatic microscopic scanner, comprising:
an image acquisition mechanism (IAM);
a microscopic scanning mechanism, the IAM on top of and connecting to the microscopic scanning mechanism, the IAM and the microscopic scanning mechanism moving together in an X-axis direction, a Y-axis direction and a Z-axis direction under an action of a power control mechanism, the microscopic scanning mechanism having a lens barrel;
a stage mechanism fixed in place below the IAM and the microscopic scanning mechanism, the stage mechanism having a tray; and
a light source mechanism fixed in place below the stage mechanism, the light source mechanism having a flat light source with a condenser set right below the tray of the stage mechanism, a flat light source area greater than or equal to a total area of the tray of the stage mechanism.

2. The fully automatic microscopic scanner according to claim 1, wherein the IAM adopts a line array camera, and the flat light source adopts a linear light source.

3. The fully automatic microscopic scanner according to claim 2, wherein the light source mechanism further comprises:
a light source housing having a plurality of sides, the light source housing having a bottom with a plurality of cooling fans; and a light source controller, the flat light source connecting to the light source controller, the flat light source controlled by the light source controller for startup and shutdown.

4. The fully automatic microscopic scanner according to claim 3, wherein a water cooling unit is provided around a side of the light source housing.

5. The fully automatic microscopic scanner according to claim 4, wherein distance between the flat light source and a bottom of the tray is 10 mm to 30 mm, and a brightness of the flat light source is not less than 800,000 lux.

6. The fully automatic microscopic scanner according to claim 5, wherein the stage mechanism further comprises a platform with a rotating mechanism at a center and a pair of ends, the platform symmetrically provided with a tray for objects to be detected at each end, such that each end of the tray for the objects to be detected on the platform can be fixed directly above the light source mechanism by an action of the rotating mechanism.

7. The fully automatic microscopic scanner according to claim 6, further comprises:
 a general control mechanism connecting with the IAM, the power control mechanism, and the light source mechanism;
 a laser pre-focus system connecting to the general control mechanism, the laser pre-focus system having a laser range finder and a laser pre-focus system controller connecting to the laser range finder, the laser range finder disposed beside the lens barrel of the microscopic scanning mechanism, the laser range finder configured for detecting a height change of a surface of an object to be detected in a to-be-detected area of the tray, the laser range finder disposed in scanning direction of the microscopic scanning mechanism, the laser range finder transmitting the height change and a detection value to the laser pre-focus system controller; and
 the laser pre-focus system controller configured to pre-measure a focal length parameter required when the microscopic scanning mechanism reaches the to-be-detected area, the controller transmitting the focal length parameter to the general control mechanism after receiving the focal length parameter, the general control mechanism controlling the power control mechanism to drive the microscopic scanning mechanism to achieve fast focusing.

8. The fully automatic microscopic scanner according to claim 7, wherein the microscope scanning mechanism further comprises a laser range finder disposed on a lens barrel on a leftward moving side of the lens barrel of the microscopic scanning mechanism and on a rightward moving side of the lens barrel.

9. The fully automatic microscopic scanner according to claim 8, wherein the laser range finder has a laser emission axis angle of 65 to 85 degrees in relation to a top surface of the stage mechanism.

10. The fully automatic microscopic scanner according to claim 2, wherein the power control mechanism further comprises:
 a Z-axis movement control unit having a Z-axis fixing block, a Z-axis fixing plate, a Z-axis ball screw and a Z-axis motor, a first side of the Z-axis fixing block fixing the microscopic scanning mechanism, and a second opposite side fixedly provided with a Z-axis slider, the Z-axis fixing block having a middle provided with a Z-axis screw nut, the Z-axis fixing plate fixing the Z-axis motor and the Z-axis ball screw, the Z-axis provided with a pair of guide rails vertical to the Z-axis, the Z-axis slider matching the Z-axis guide rails, the Z-axis screw nut matching the Z-axis ball screw, the Z-axis ball screw connecting with the Z-axis motor such that the Z-axis ball screw will, under an action of the Z-axis motor, drive the Z-axis fixing block to move up and down relative to the Z-axis fixing plate, and further drive the microscopic scanning mechanism and the IAM to move up and down relative to the stage mechanism;
 an X-axis movement control unit having an X-axis fixing plate, an X-axis ball screw and an X-axis motor, the X-axis fixing plate configured for fixing the X-axis motor and the X-axis ball screw, the X-axis ball screw provided with guide rails horizontal to the X-axis on the Z-axis fixing plate, the Z-axis fixing plate having the X-axis sliders and the X-axis screw nut, the X-axis slider matching the X-axis guide rails, the X-axis screw nut matching the X-axis ball screw the X-axis ball screw connecting to the X-axis motor such that the X-axis ball screw will, under an action of the X-axis motor, drive the Z-axis fixing plate to move leftwards and rightwards, and further drive the Z-axis movement control unit, the microscopic scanning mechanism and the IAM to move leftwards and rightwards relative to the stage mechanism; and
 a Y-axis movement control unit having a Y-axis fixing plate having an upper part and a lower part, a Y-axis support plate, a Y-axis ball screw and a Y-axis motor, the upper part of the Y-axis fixing plate fixed to the X-axis fixing plate vertically, and the lower part thereof provided with a Y-axis slider and a Y-axis ball screw nut, the Y-axis support plate comprising a pair of support plates parallel to each other, the support plates are respectively and vertically provided at both ends of the Y-axis fixing plate, and on each of the pair are provided with Y-axis guide rails, the Y-axis ball screw and the Y-axis motor are fixed onto either of the support plates, the Y-axis slider matching the Y-axis guide rails, the Y-axis screw nut matching the Y-axis ball screw, the Y-axis ball screw connecting to the Y-axis motor, such that the Y-axis ball screw will, under an action of the Y-axis motor, drive the Y-axis fixing plate to move forwards and backwards, and further drive the X-axis movement control unit, the Z-axis movement control unit, the microscopic scanning mechanism and the IAM to move forwards and backwards relative to the stage mechanism.

11. The fully automatic microscopic scanner according to claim 10, wherein the microscopic scanning mechanism comprises at least one microscopic scanning units further comprising a magnification-adjustable lens tube and a replaceable objective lens, the IAM comprises at least one line array cameras, the microscopic scanning units and the line array cameras equal in quantity and mounted correspondingly one by one forming a set; each set of the microscopic scanning units and the line array cameras connecting to one set of the Z-axis movement control units respectively and controlled by the corresponding Z-axis movement control unit separately.

12. The fully automatic microscopic scanner according to claim 10 wherein the Y-axis movement control unit further comprises a Y-axis location sensor configured to collect location information of the Y-axis fixing plate along the Y-axis guide rails and the X-axis movement control unit further comprises an X-axis location sensor configured to collect location information of the Z-axis fixing plate along the X-axis guide rails.

13. The fully automatic microscopic scanner according to claim 10, wherein in the fully automatic microscopic scanner further comprises a base which is a hollow box having a top plate, the hollow box provided with the light source mechanism, the hollow box having an opening for fixing the stage mechanism on the top plate of the box, the top plate of the box having a plurality of supports wherein the Y-axis support plate is fixedly provided onto the supports, and an outer shield provided above the base, the outer shield having a side wall of the outer provided with a display screen connecting to the general control mechanism and an opening for exchanging a loading tray of the stage mechanism.

14. A fully automatic microscopic scanner, comprising:
an image acquisition mechanism (IAM), the IAM adopting a line array camera;
a microscopic scanning mechanism below the IAM and connecting thereto, the microscopic scanning mechanism and the IAM moving in X-axis, Y-axis and Z-axis directions under an action of a power control mechanism;
a stage mechanism below the microscopic scanning mechanism; and
a light source mechanism below the stage mechanism, the stage mechanism and the light source mechanism fixed in place, the light source mechanism having a flat light source with a condenser, the light source mechanism connecting to and controlled by the power control mechanism, the power control mechanism achieving a linkage of the microscopic scanning mechanism and the IAM in the X-axis and the Y-axis directions.

15. The fully automatic microscopic scanner according to claim 14, wherein the light source mechanism further comprises a light source housing with a bottom and a light source controller, the bottom of the light source housing having a plurality of cooling fans, the flat light source connecting to the light source controller, the light source controller controlling for startup and shutdown.

16. The fully automatic microscopic scanner according to claim 14, further comprises:
a general control mechanism connecting with the IAM, the power control mechanism, and the light source mechanism;
a laser pre-focus system connecting to the general control mechanism, the laser pre-focus system having a laser range finder and a laser pre-focus system controller connecting to the laser range finder, the laser range finder disposed beside the lens barrel of the microscopic scanning mechanism, the laser range finder configured for detecting a height change of a surface of an object to be detected in a to-be-detected area of the tray, the laser range finder disposed in scanning direction of the microscopic scanning mechanism, the laser range finder transmitting the height change and a detection value to the laser pre-focus system controller; and
the laser pre-focus system controller configured to pre-measure a focal length parameter required when the microscopic scanning mechanism reaches the to-be-detected area, the controller transmitting the focal length parameter to the general control mechanism after receiving the focal length parameter, the general control mechanism controlling the power control mechanism to drive the microscopic scanning mechanism to achieve fast focusing.

17. The fully automatic microscopic scanner according to claim 16, wherein the microscope scanning mechanism has a laser range finder on both sides of the lens barrel in the left and right moving directions, the laser range finder having a laser emission axis angle of 65 to 85 degrees in relation to a top surface of the stage mechanism.

18. The fully automatic microscopic scanner according to claim 14, wherein in that the power control mechanism further comprises:
a Z-axis movement control unit having a Z-axis fixing block, a Z-axis fixing plate, a Z-axis ball screw and a Z-axis motor, a first side of the Z-axis fixing block fixing the microscopic scanning mechanism, and a second opposite side fixedly provided with a Z-axis slider, the Z-axis fixing block having a middle provided with a Z-axis screw nut, the Z-axis fixing plate fixing the Z-axis motor and the Z-axis ball screw, the Z-axis provided with a pair of guide rails vertical to the Z-axis, the Z-axis slider matching the Z-axis guide rails, the Z-axis screw nut matching the Z-axis ball screw, the Z-axis ball screw connecting with the Z-axis motor such that the Z-axis ball screw will, under an action of the Z-axis motor, drive the Z-axis fixing block to move up and down relative to the Z-axis fixing plate, and further drive the microscopic scanning mechanism and the IAM to move up and down relative to the stage mechanism;
an X-axis movement control unit having an X-axis fixing plate, an X-axis ball screw and an X-axis motor, the X-axis fixing plate configured for fixing the X-axis motor and the X-axis ball screw, the X-axis ball screw provided with guide rails horizontal to the X-axis on the Z-axis fixing plate, the Z-axis fixing plate having the X-axis sliders and the X-axis screw nut, the X-axis slider matching the X-axis guide rails, the X-axis screw nut matching the X-axis ball screw the X-axis ball screw connecting to the X-axis motor such that the X-axis ball screw will, under an action of the X-axis motor, drive the Z-axis fixing plate to move leftwards and rightwards, and further drive the Z-axis movement control unit, the microscopic scanning mechanism and the IAM to move leftwards and rightwards relative to the stage mechanism; and
a Y-axis movement control unit having a Y-axis fixing plate having an upper part and a lower part, a Y-axis support plate, a Y-axis ball screw and a Y-axis motor, the upper part of the Y-axis fixing plate fixed to the X-axis fixing plate vertically, and the lower part thereof provided with a Y-axis slider and a Y-axis ball screw nut, the Y-axis support plate comprising a pair of support plates parallel to each other, the support plates are respectively and vertically provided at both ends of the Y-axis fixing plate, and on each of the pair are provided with Y-axis guide rails, the Y-axis ball screw and the Y-axis motor are fixed onto either of the support plates, the Y-axis slider matching the Y-axis guide rails, the Y-axis screw nut matching the Y-axis ball screw, the Y-axis ball screw connecting to the Y-axis motor, such that the Y-axis ball screw will, under an action of the Y-axis motor, drive the Y-axis fixing plate to move forwards and backwards, and further drive the X-axis movement control unit, Z-axis movement control unit, the microscopic scanning mechanism and the IAM to move forwards and backwards relative to the stage mechanism.

19. The fully automatic microscopic scanner according to claim 18, wherein the microscopic scanning mechanism comprises two microscopic scanning units, the IAM comprises two line array cameras; the microscopic scanning units and line array cameras mounted correspondingly one by one forming a set; each set of the microscopic scanning units and the line array cameras connecting to and controlled separately by a respective Z-axis movement control units, the two sets of microscopic scanning units and line array cameras corresponding two rows of items to be detected respectively, a linear light source in the form of a long bar and a length direction thereof is perpendicular to the two rows of items to be detected, the two sets of microscopic scanning units and the line array cameras cooperate with the light source mechanism under an effect of power control mechanism to simultaneously scan the two rows of items to be detected.

* * * * *